Patented Nov. 10, 1931

1,831,760

UNITED STATES PATENT OFFICE

ANELLA WIEBEN, OF AMES, IOWA

IGNITING COMPOSITION

No Drawing.   Application filed July 11, 1928.   Serial No. 292,038.

This application is a continuation in part of my application Serial Number 257,787, filed February 28, 1928, for Letters Patent for Igniting compositions.

This invention relates to igniting compositions and to applying the same to an article, and to the resultant product.

The objects of this invention are the production of a composition which can be applied to the tips of cigars, cigarettes, and the like and ignited without the slightest interference with the draft thereof or with the drawing of smoke through them and which, when so applied and ignited, will be entirely free of disagreeable odors and tastes or deleterious or harmful fumes or gases; the production of an igniting composition which will transmit its combustion to a combustible body with which it is in contact without the requirement of a draft; the production of an igniting composition which is not liable to spontaneous combustion; the production of an igniting composition which remains permeable to the air while burning; and the production of a cigar, cigarette, stogie, or the like which shall have a tip of an igniting material or composition which remains permeable while burning.

The composition is not itself limited in its use to tipping cigars, cigarettes, and similar tobacco products, but may be employed for other purposes for which an easily ignited substance is desired, but especially if the user requires porosity while burning.

My composition consists of an easily combustible or reducing material such as starch, or wood flour, or wood meal, or corn-cob flour or corn-cob meal, or cork flour, or powdered tobacco, or any woody or fibrous combustible material which burns readily without producing unpleasant tastes or odors or deleterious fumes or gases, or any mixture of these substances, or any one of these substances or a mixture of them with an inorganic reducing material such as antimony sulfid when a slight odor or taste is not objectionable and porosity is required; an oxidizing material or agent such as potassium chlorate, or sodium chlorate, or an alkaline earth chlorate, or a mixture of any of these; a material such as iron oxid, manganese dioxid, charcoal, or a mixture of such substances which will retain the heat generated by the burning and aid in transmitting the combustion to less easily ignited materials; and a binding material such as glue, gum or dextrin. A small amount of abrasive such as powdered glass, carborundum, or emery may be added.

If a single tip is desired, I prefer to use the ingredients in about the following proportions by weight, viz:

| | Parts |
|---|---|
| Postassium chlorate | 6 |
| Starch | 3 |
| Corn-cob or wood flour | 1 |
| Ferric oxid | 1 |
| Carborundum | 1 |
| Acacia gum solution, U. S. P. preparation | 2½ | enough water to make a thick paste being added. The solution of acacia gum will preferably be prepared in accordance with the United States Pharmacopoeia, see edition 10, page 243. The sodium benzoate used in such gum solution may be omitted if the solution is to be used and dried soon enough so that souring will not take place, and this applies not only to the above example, but to all other examples hereinafter referred to. The dry ingredients are preferably sifted together several times and then stirred into the solution of gum, though this is not essential, and the ingredients may be compounded in any suitable manner.

Instead of the starch, corn-cob meal or flour, wood meal or flour, powdered cork, or tobacco, or mixtures of these may be used, although it may then become necessary to change the proportions somewhat. Instead of potassium chlorate, sodium chlorate or other alkali or alkaline earth chlorate may be used; and, similarly, instead of ferric oxid, charcoal or manganese dioxid may be employed, the other ingredients remaining the same. The resulting composition or product is a stiff paste which may be applied to the tips of cigars, cigarettes, or other articles and then allowed to dry. It may then be ignited by rubbing on a prepared surface, the combustion being transferred to the cigar, cigarette, or other article.

A double tip may be prepared which ignites more readily and with less flare than the single tip. The material in direct contact with the body to be ignited is composed of the same substances as the single tip, but the optimum proportions are different. I prefer the following composition:

|  | Parts |
|---|---|
| Potassium chlorate | 6 |
| Starch | 4 |
| Corn-cob meal | 1 |
| Ferric oxid | 1 |
| Acacia gum solution, U. S. P. preparation | 2½ | enough water to make a thick paste being added. This composition is not readily ignited by friction. It is ignited by a second and more sensitive tip composed of the same materials in approximately the following proportions:

|  | Parts |
|---|---|
| Potassium chlorate | 6 |
| Starch | 2 |
| Corn-cob meal | 1 |
| Ferric oxid | 1 |
| Carborundum | 1 |
| Acacia gum solution, U. S. P. preparation | 2½ | enough water to make a paste of the desired consistency being added.

For the single tip or for the igniting portion of the double tip, good results may be obtained by using mixtures or compositions within the following limits: one to four parts of an organic reducing agent such as starch, corn-cob meal or flour, wood meal or flour, cork flour, or powdered tobacco; one to three parts of an inorganic reducing material such as antimony sulfid mixed with small amounts of one or more of the above mentioned organic reducing agents to make the material porous on ignition; one to twenty-four parts of an oxidizing agent such as potassium chlorate, sodium chlorate, or an alkaline earth chlorate. The iron oxid and the abrasive may be omitted entirely and the mixture will still ignite easily. Other glues, gums or dextrins may be substituted, but acacia gum has proven most satisfactory in that it does not form a smooth glassy coating, which cuts down the ease of ignition, nor does the tip tend to crumble on aging, nor does it produce distasteful or disagreeable odors or fumes on ignition.

The prepared striking surface may be of any composition such as is used for igniting safety matches. A mixture of about four parts of red phosphorus, one part of potassium chlorate or other oxidizing agent, two parts of glue, and two parts of an abrasive is satisfactory for surfacing any solid body. The materials are mixed with an appropriate amount of water, applied, and dried, in accordance with usual practice.

The essential improvement consists in substituting in whole or in part for the usual inorganic reducing substances in igniting compositions organic materials such as starch, corn-cob meal or flour, wood meal or flour, cork flour, or powdered tobacco, which produce no deleterious or offensive fumes or odors or disagreeable tastes and which remain porous while burning. The ordinary igniting compositions used for safety matches do not remain porous while burning and a circulation of gases through the burning mass cannot be maintained unless some substance similar to these organic materials is used. Moreover, these organic reducing agents are cheaper than the ordinary inorganic reduction agents such as antimony sulfid.

Having thus described my invention, what I claim is:

An igniting composition consisting of the elements in the proportions, by weight, as follows:

|  | Parts |
|---|---|
| Potassium chlorate | 6 |
| Starch | 3 |
| Ferric oxid | 1 |
| A granular material of the group consisting of starch, wood flour, wood meal, corn-cob flour, corn-cob meal, cork flour and any woody or fibrous combustible material which burns readily without producing unpleasant tastes or odors or deleterious fumes or gases | 1 |
| An abrasive | 1 |
| Acacia gum solution, U. S. P. preparation | 2½ | and sufficient water to make a stiff paste.

In testimony whereof, I have signed my name to this specification at Milwaukee, Wisconsin, this 7th day of July 1928.

ANELLA WIEBEN.